United States Patent Office 3,000,828
Patented Sept. 19, 1961

3,000,828
MANUFACTURE OF METAL OXIDES
AND OF FERRITES
Sidney Ernest Buckley and Douglas Hiley Owen, London, England, assignors to International Standard Electric Corporation, New York, N.Y.
No Drawing. Filed Mar. 3, 1955, Ser. No. 492,019
Claims priority, application Great Britain Mar. 12, 1954
20 Claims. (Cl. 252—62.5)

This invention relates to the manufacture of ferric oxide and also to the manufacture of ferrites. Ferrites are composed of ferric oxide ($Fe_2O_3$) united with one or more dibasic metallic oxides and they have hitherto been manufactured by milling together mixtures of the constituent oxides, pressing and sintering.

In the manufacture of ferrites difficulty sometimes arises in obtaining pure ferric oxide and in a state in which it will readily combine with other metallic oxides to form ferrites. This difficulty has previously been overcome by using very pure ferric salts of iron, such as ferric oxalate and forming the oxide therefrom.

It is an object of the present invention to provide a process for the production of pure ferric oxide which is more economical than known methods.

The starting material for the manufacture of ferric oxide according to the present invention is metallic iron powder. According to known art, iron powder can be oxidised partly or wholly to magnetite $Fe_3O_4$ by the action of steam at elevated temperatures, and this last mentioned oxide can then only be converted into ferric oxide $Fe_2O_3$ by heating to temperatures between 1100° C. and 1300° C. The resulting ferric oxide, moreover, is found to be unsuitable for the production of high quality ferrites.

According to the present invention a method of manufacturing ferric oxide comprises heating iron powder in a current of steam at a temperature from 300° C. to 650° C., milling the resultant product in water and then calcining in air at a temperature of between 150° C. and 1000° C.

This method has proved to be a very economical method of manufacturing ferric oxide for use in the manufacture of ferrites. The temperatures used are moderate and in consequence cheaper furnaces, trays and the like can be used than hitherto.

The upper limit of temperature for the heating in steam is 650° C., as if this limit be exceeded the resulting ferric oxide is found not to be sufficiently reactive to produce ferrites, and moreover the product is not friable.

In carrying out this heating in steam the iron powder is placed in shallow trays in a furnace and heated to the required temperature whilst a current of steam is passed through the furnace. The time during which this heating is continued depends upon the temperature but a time of 3 hours at 450° C. seems to be about the optimum. If the temperature is higher than this the time of heating can be shortened but the product is harder and more difficult to mill. If the temperature is lower than 450° C. the time of treatment is increased.

After this heating in steam the contents of the trays are tipped into distilled water in a ball mill and milling takes place for a time sufficient to break down the product of the steam heating to a fine powder. This product is incompletely oxidised iron but it is highly reactive and oxidation continues in the ball mill, as evidenced by evolution of hydrogen. After this milling the water is driven off and the dried product calcined at a temperature between 150° C. and 1000° C.

It may be noted here that the invention is applicable to the manufacture of ferric oxide as one constituent of a mixture of oxides as will be explained later and the upper limit of temperature of calcining is placed at 1000° C., which is practicable in some circumstances if the ferric oxide is being produced as one constituent of a mixture but if the method of manufacture is that of ferric oxide free from other oxides, i.e., if iron powder not mixed with other metallic powders is used as the starting materials, the temperature of calcining should not exceed 500° C. The preferred temperature range for calcining is, in all cases, between 300° C. and 500° C. inclusive. The time of calcining depends upon the temperature, being longer, the lower the temperature. 2 hours at 500° C. has been found satisfactory.

The resulting ferric oxide is very suitable for the manufacture of ferrites by admixture with other oxides, pressing and sintering.

The starting material for the manufacture of ferric oxide may be electrolytic iron, the iron powder sold as Carbonyl E, or the iron powder sold as Carbonyl C. Electrolytic iron contains small amounts of impurities, notably phosphorus and silica, but the phosphorus appears to be eliminated during the above described process and the amounts of silica present are found not to be deleterious. In any event ferrites formed from ferric oxide prepared by the above described process from electrolytic iron appear to have better properties than corresponding ferrites, having the same silica content, prepared by other processes.

Carbonyl E iron is prepared from the decomposition of iron carbonyl and contains small amounts of carbon and oxygen. Carbonyl C iron is the product obtained by a further treatment of Carbonyl E iron.

Examples of the manufacture of ferric oxide and the use thereof in the manufacture of ferrites will now be given.

*Example 1*

250 grams of iron powder obtained from the decomposition of iron carbonyl and sold under the trade designation Carbonyl C was heat treated in steam at 400° C. for 6 hours. The product was milled for 24 hours with an equal weight of distilled water, dried out and then calcined at 500° C. for 2 hours with free access to air. Analysis of the product at this stage showed a percentage content of iron by weight as 69.57% as compared with a theoretical content of 69.94% for ferric oxide, i.e. a practically complete conversion to ferric oxide. 171.93 grams of this product was mixed with 44.7 grams of pure manganese oxide $Mn_3O_4$ and 32.42 grams of pure zinc oxide and milled for 24 hours with an equal weight of distilled water, and dried out at 150° C. Different batches were pressed at 35 tons per square inch (5 metric tons per square cm.) and subjected to heat treatment for 4 hours in an atmosphere of nitrogen containing 1% by volume of oxygen at respective temperatures of 1125° C., 1150° C. and 1175° C. to yield the magnetic properties indicated below:

| Temperature, ° C. | Magnetic properties | | | | | | |
|---|---|---|---|---|---|---|---|
| | $\mu$ | $K_1$ | $K_2$ | $K_e$ | $\frac{t}{\mu} \times 10^3$ | $\frac{h}{\mu^2} \times 10^6$ | $\frac{F_n}{\mu} \times 10^3$ |
| 1,175° C | 1,970 | 21 | 0.81 | 0.8 | 8.0 | 570 | 0.26 |
| 1,150° C | 1,400 | 18 | 0.44 | 0.3 | 10.0 | 450 | 0.14 |
| 1,125° C | 850 | 7.8 | 0.42 | 0.29 | 7.6 | 680 | 0.20 |

In the above table $\mu$ is the permeability, $K_1$, $K_2$ and $K_e$ are the residual loss, hysteresis loss and eddy current loss coefficients as defined in, for example, our British Patent 683,722. The remaining columns of the table express the magnetic properties in an alternative form according to the formula $$\frac{R_p}{L} = F_n \cdot \frac{f^2}{800^2} + h \cdot \frac{NI}{e} \cdot \frac{f}{800} + t \cdot \frac{f}{800}$$

based on the original Jordan expression for core loss and used in countries on the Continent of Europe.

It is known that certain oxides of other metals than iron can be produced by heating the metal powders in steam and then calcining in air and we have found that ferrites can be produced by treating a mixture of iron and other metals by the same process as described above for the production of ferric oxide from iron powder and then pressing and sintering the mixture of oxides so obtained. Such a process for the production of ferrites possesses several advantages over a process using the oxides as starting materials.

In the first place the process is more easily controlled for obtaining consistent results since it is simpler and involves fewer steps than previously proposed processes.

In the second place the process is more economical, more particularly for the production of high grade ferrites. It is known that the presence of impurities even in small amounts may adversely affect the properties of a ferrite. In order to prepare ferrites free from impurities it is necessary that the starting materials should be free from impurities. It has hitherto been thought necessary to start with salts, such as oxalates, since such salts in a high degree of purity are commercially available though they are expensive. However a careful analysis of commerically available oxalates, for example, is necessary since the state of purity of those obtainable is variable. Metal powders, on the other hand, are commercially available in a high consistent state of purity at a cost which compares favourably with the cost of the oxalates.

A third advantage we have found is that the powdered mixture of oxides obtained by the process according to the invention can be readily pressed into core form without the use of a plasticiser, and without danger of breakage on removal from the die.

Yet another advantage is that where high Q materials are required the temperature for sintering to produce such properties is less with mixtures of oxides made according to the present invention than according to previously known methods.

Although, as stated above, a mixture of all the metal powders required in the ferrite may be subjected to the same heat treatment there are cases in which it may be preferable to manufacture only a mixture of some oxides according to the present invention and subsequently add a further oxide thereto.

An example of such a process of manufacture of a ferrite will now be given.

*Example 2*

A mixture of 193.76 grams of iron powder (Carbonyl C) with 41.41 grams of pure zinc dust was heat treated in steam for 6 hours at 400° C. The product was milled for 4 hours with twice its weight of distilled water, dried out and then calcined at 500° C. for 2 hours with free access to air. 204.35 grams of the product was mixed with 44.7 grams of pure manganous oxide Mn₃O₄ and milled for 24 hours with twice its weight of distilled water, then dried out at 150° C. Two batches were then separately pressed at 35 tons per square inch and heat treated at 1200° C. and 1175° C. for 4 hours in nitrogen containing 1% by volume of oxygen. The following were the magnetic properties obtained.

| Temperature of heat treatment | $\mu$ | $K_1$ | $K_2$ | $K_e$ | $\frac{t}{\mu} \times 10^3$ | $\frac{h}{\mu^2} \times 10^6$ | $\frac{F_n}{\mu} \times 10^3$ |
|---|---|---|---|---|---|---|---|
| 1,200° C | 2,000 | 21 | 2.0 | 0.55 | 8 | 1,400 | 0.17 |
| 1,175° C | 1,950 | 25 | 0.78 | 1.24 | 8 | 550 | 0.4 |

Chemical analysis of the powder before pressing and sintering showed the proportions of iron manganese and zinc present by weight as 48.70%, 12.78% and 9.88% respectively as compared with theoretical percentages of 48.44%, 12.84% and 10.37% indicating that the reaction to produce the oxides from the metal had gone practically to completion. Analysis of the finished ferrite prepared by sintering at 1175° C. showed 47.49% by weight of ferric iron and 1.58% of ferrous iron these being in close agreement with the theoretically expected results expected as described in British Patent 730,703 granted September 14, 1955 of the Centre National de la Recherche Scientifique according to which the proportions of ferric and ferrous iron should be 47.6% and 1.5% respectively.

We have found, however, that where it is desirable to start with one or more of the oxides instead of with the metal or metals it is possible to mix the oxide or oxides with iron powder and subject the mixture to the same treatment as described above for the iron powder alone. Thus barium ferrite, a compound of BaO with Fe₂O₃, which is a permanent magnet material, may be made from a mixture of barium oxide or barium carbonate with iron powder. The method is particularly advantageous in such case since barium oxide and barium carbonate are more readily available than barium metal.

This method is further illustrated in the following example:

*Example 3*

A mixture of 184.5 grams of iron powder (Carbonyl C) 83.6 grams of pure zinc powder and 37.8 grams of nickel oxide was heat treated in steam at 600° C. for 3 hours. The friable product was milled for 36 hours with twice its weight of distilled water in a mill having steel balls. The resulting wet slurry was poured out of the mill, dried at 200° C. to form a fine powder and then calcined in a current of air at 500° C. for two hours.

The resulting mixture was found on analysis to have the following composition 49.9 mol. percent Fe₂O₃
15.3 mol. percent NiO
34.8 mol. percent ZnO The dry powder was pressed at 35 tons per square inch into a toroidal ring, heated at 1200° C. for 4 hours in a current of oxygen and allowed to cool to room temperature in the same current of oxygen.

The resulting core was found to have the following properties:

$\mu = 875$, $t = 11$, $h = 2,200$, $F_n = 0.18$ $\frac{\tan \delta}{\mu}$ at 500 kc./s. $= 0.000057$ Nickel has hitherto been considered to be extremely difficulty to oxidise by heat treatment in steam, but we have found that, if mixed with iron powder or a mixture of iron powder and another metal powder it can be oxidised by the above described process as shown in the following example:

*Example 4*

A mixture of 184.5 grams of iron powder (Carbonyl C) 83.6 grams of pure zinc powder and 30.5 grams of fine nickel powder were mixed and heat treated in steam as described for the mixture in Example 3. The mixture increased in weight to 375 grams which on analysis corresponded to 85–90% conversion into a mixture of Fe₃O₄, NiO and ZnO the balance being unchanged metal powders or the oxide FeO.

The friable product was milled in distilled water, dried and calcined as described in Example 3.

The powder at this stage was found to have the following composition:

48.53 molar percent $Fe_2O_3$
2.64 molar percent FeO
14.8 molar percent NiO
34.04 molar percent ZnO The dry powder was pressed into a toroidal ring at 5 metric tons per square cm. and subjected to the same heat treatment as in Example 3. The resulting core had the following properties:

$\mu_0=430$; $t=20$; $h=1320$; $F_n=0.18$ $\dfrac{\tan \delta}{\mu}$ at 500 kc./s. $=0.00006$ It has been stated above that in making ferrites by a continuous process starting from the metal powders, these powders can be heated in steam up to a temperature of 1000° C. and that in the calcining step the temperature can also be taken up to 1000° C. If, however, the temperature in either of these two steps be taken above about 500° C., some formation of ferrite takes place before the pressing into core form. For the production of magnetic ferrites having the best possible properties it is preferable that ferrite formation should only take place after the mixture of oxides has been made into final core form after pressing. In all the examples for the preparation of ferrites given herein, therefore, the temperatures of heating in steam and calcining do not exceed 600° C. and 500° C. respectively, which temperatures are below that at which any formation of ferrite can take place.

*Example 5*

A mixture containing 193.76 grams finely divided Carbonyl C iron, 51.40 grams electrolytic manganese reduced to fine powder and 41.48 grams zinc powder was treated in steam at 400° C. for 6 hours. The mixture increased in weight to 365 grams corresponding to 65% conversion of metals to oxides. This product was milled for 24 hours with an equal weight of distilled water, dried out at 150° C. and calcined at 500° C. for 2 hours with free access to air. Then it was milled for a further 24 hours with distilled water, dried out and divided into three batches. Each batch was then pressed at 35 tons per square inch and subjected to heat treatment for 4 hours in an atmosphere of nitrogen containing 1% by volume of oxygen. The results obtained with different temperatures of heat treatment are given below:

| Temperature of heat treatment | $\mu$ | $K_1$ | $K_2$ | $K_e$ | $\dfrac{t}{\mu}\times 10^3$ | $\dfrac{h}{\mu^2}\times 10^6$ | $\dfrac{F_n}{\mu}\times 10^3$ |
|---|---|---|---|---|---|---|---|
| 1,175 | 2,243 | 8.5 | 4.1 | 0.68 | 2.9 | 2,500 | 0.19 |
| 1,150 | 1,820 | 10.8 | 1.79 | 0.63 | 4.4 | 1,440 | 0.21 |
| 1,125 | 1,390 | 15 | 0.7 | 0.5 | 8.6 | 720 | 0.22 |

Chemical analysis of the powder before pressing and sintering showed that the reaction had possibly not gone to completion and that some unchanged metal might be present. Chemical analysis of the pressed material sintered at 1125° C. also, however showed close agreement with the theoretically expected results as regards the proportions of ferric and ferrous iron.

The magnetic properties obtained are of a high standard.

For preparation of manganese zinc ferrites a process of heat treating the pressed core in an atmosphere of nitrogen containing a controlled percentage of oxygen has been described in British patent 730,703 of the Centre National de la Recherche Scientifique and was followed in Examples 1, 2 and 5 given above.

In order to avoid any premature formation of ferrites it is preferred in some cases in the manufacture of manganese zinc ferrites according to the invention to set the times and temperatures for the production of a mixture of oxides at such values that the oxidation is not quite, though nearly completed and to carry out the first part of the heat treatment after pressing in an atmosphere of air in order to complete the oxidation. The atmosphere is then changed to one of nitrogen containing a controlled small percentage of oxygen according to the above mentioned British Patent 730,703 for the remaining part of the heat treatment.

*Example 6*

252 grams of electrolytic iron powder, 83 grams of electrolytic manganese powder and 27.55 grams of fine zinc powder sold as an analar reagent were mixed together and the mixture was heated in steam at 450° C. for 3 hours. The mixture increased in weight as a result to 446 grams.

The friable product was milled for 36 hours with twice its weight of distilled water in a steel ball mill. The resulting wet slurry was poured out of the mill and dried at 200° C. to form a fine powder which was then calcined in air at 350° C. for 2 hours.

On analysis this powder was found to have the composition.

53.09 molar percent $Fe_2O_3$
1.94 molar percent FeO
35.45 molar percent MnO
9.5 molar percent ZnO In the above the whole of the deficiency in oxygen has been attributed to the presence of FeO though it is possible that some of it may be due to incomplete oxidation of the manganese to MnO.

The dry powder was pressed at 5 metric tons per square centimeter into a toroidal ring and this ring was raised to a temperature of 1250° C. in a current of air. During this procedure the oxidation of the constituents is completed and the temperature is then maintained at 1250° C. for 2 hours in a gaseous medium containing 99% nitrogen and 1% oxygen and then allowed to cool down to room temperature in nitrogen in a period of 12 hours.

The composition of the final ferrite was found to be:

50.21 molar percent $Fe_2O_3$
5.91 molar percent FeO
34.56 molar percent MnO
9.32 molar percent ZnO The ring possessed the following magnetic properties $\mu_0=1250$; $\dfrac{t}{\mu}\times 10^3=5$; $\dfrac{h}{\mu^2}\times 10^6=410$ $\dfrac{F_n}{\mu}\times 10^3=0.03$; $\dfrac{\tan \delta}{\mu}$ at 100 kc./s. $=0.0000028$ The following example illustrates the formation of ferrites of high magnetic qualities by the use of pure metal powders, by keeping temperatures during the oxide formation low enough to avoid ferrite formation and also at such values that the oxidation is nearly but not quite complete and by arranging the conditions during the first part of the sintering that oxidation is then completed.

*Example 7*

239.64 grammes of fine iron powder sold under the trade name of Carbonyl C, 65.29 grammes of manganese sold as electrolytic manganese flake and broken down to fine powder, and 52.99 grammes of fine zinc powder sold as an "analar reagent" were mixed together and heat treated in a rapid current of steam at 450° C. for 3 hours. The friable product was milled for 36 hours in a steel mill with distilled water. The resulting wet slurry was poured out of the mill and dried off at 200° C. to form a fine powder. This was calcined in a current of air at 350° C. for 2 hours.

On analysis this powder was found to consist of 52.05 mol. percent $Fe_2O_3$, 0.90 mol. percent FeO, 27.84 mol. percent MnO and 19.12 mol. percent ZnO.

The dry powder was pressed at 5 metric tons per sq. cm. into a toroidal ring. This toroidal ring was then taken up to a temperature of 1250° C. in a rapid current of air. During this part of the sintering operation the oxidation to $Fe_2O_3$ and the other oxides is completed. The ring was maintained at 1250° C. for 2 hours in a gaseous medium containing 99% nitrogen and 1% oxygen and then allowed to cool for 12 hours down to room temperature. During this last part of the sintering part of the $Fe_2O_3$ is converted to FeO as described in British Patent 730,703, previously referred to.

The final analysis of the finished ferrite is as follows:

49.7 percent $Fe_2O_3$
4.2 percent FeO
27.4 percent MnO
18.5 percent ZnO

The magnetic properties were as follows:

$$\mu_0 = 2860; \frac{t}{\mu} \times 10^3 = 3.86; \frac{h}{\mu^2} \times 10^6 = 558$$

$$\frac{F_n}{\mu} \times 10^3 = .17 \text{ and } \frac{\tan \delta}{\mu} \text{ at } 100 \text{ kc./s.} = 0.000006$$

This material is very suitable for use in wide band transformers working at carrier and lower frequencies. The following example illustrates how the same basic materials sintered at a somewhat lower temperature, can be given very high Q factors.

Example 8

The powder obtained from the starting materials of Example 7 and heated in steam, milled in water and calcined as in that example was pressed into a toroidal ring under a pressure of 5 metric tons per sq. cm. and taken up to 1175° C. in a rapid current of air. The ring was then maintained for 2 hours at that temperature in a gaseous medium containing 99% nitrogen and 1% oxygen and finally allowed to cool in nitrogen down to room temperature in a period of 12 hours.

The material then has the following properties $$\mu_0 = 1500; \frac{t}{\mu} \times 10^3 = 6.4; \frac{h}{\mu^2} \times 10^6 = 600$$

$$\frac{F_n}{\mu} \times 10^3 = 0.02; \frac{\tan \delta}{\mu} \text{ at } 100 \text{ kc./s.} = 0.0000022$$

Using material of this quality Q factors ranging between 1200 and 1400 have been obtained for pot cores of inductance of the order of 1 millihenry and a hysteresis factor less than 1.

The invention is not limited to ferrites having any particular range of magnetic properties; as mentioned above, it may be applied to the manufacture of permanent magnet ferrites and as shown in the following example may be applied to the manufacture of square loop ferrites to be used for digital storage of information and like purposes.

Example 9

A mixture of 202 gms. of fine iron powder sold under the trade name of Carbonyl C, 92.5 gms. of manganese sold as electrolytic manganese flake and broken down to fine powder and 17.2 gms. of fine magnesium powder sold as a chemical reagent were mixed together and heated in a rapid current of steam at 400° C. for 4 hours. The friable product was then milled for 24 hours in a steel ball mill with distilled water. The resulting wet slurry was poured out of the mill, dried off at 200° C. to form a fine powder which was then calcined at 400° C. for 2 hours in a current of air.

The product was then milled for a further 24 hours in the steel ball mill with water and dried out at 200° C.

Analysis of the powder at this stage gave 41.8 mol. percent $Fe_2O_3$
1.29 mol. percent FeO
39.8 mol. percent MnO
17.11 mol. percent MgO The dry powder was pressed into a toroidal ring at 5 metric tons per sq. cm.

This ring was raised to a temperature of 1275° C. in a rapid current of air, then maintained at this temperature for 2 hours in a gaseous medium containing 99% nitrogen and 1% oxygen and then allowed to cool in a current of pure nitrogen to room temperature during a period of 12 hours.

This yielded a material having the following properties:

$\mu_0 = 50$; $B_{max} = 2,400$ gauss $\frac{B_r}{B_m}$ (squareness ratio) = 0.90

Coercive force $H_o = 1.0$ oersted

While the principles of the invention have been described above in connection with specific embodiments, and particular modifications thereof, it is to be clearly understood that this description is made only by way of example and not as a limitation on the scope of the invention.

What we claim is:

1. Process of manufacturing a ferrite which comprises heating iron powder in a current of steam at a temperature between 400° C. and 650° C. for a time dependent upon the temperature, milling the resultant product in water, calcining the milled product in air at a temperature between 150° C. and 1000° C.

2. Process of manufacturing a ferrite which comprises manufacturing ferric oxide by the process according to claim 1, mixing the said ferric oxide with at least one other metallic oxide in the proportions required to form a ferrite, pressing the mixture into a desired form and heat treating to produce a ferrite.

3. The process according to claim 1, wherein said iron powder is heated for three hours at approximately 450° C. and calcined at a temperature between 300° C. and 500° C.

4. Process of manufacturing a ferrite which comprises heating a mixture of iron powder and the powder of another metal, whose oxide is one constituent of the ferrite, in a current of steam at a temperature between 400° C. and 650° C., milling the resultant product in water, calcining the milled product in air at a temperature between 150° C. and 1000° C., mixing the resultant product with the oxide of yet another metal required to constitute the ferrite, pressing the mixture into the desired form and heat treating to form a ferrite.

5. The process according to claim 4 in which said other metal is zinc and the oxide of yet another metal is nickel oxide.

6. The process according to claim 4, wherein said milled product is calcined at a temperature between 300° C. and 500° C.

7. Process of manufacturing a ferrite which comprises heating a mixture of metal powders in the proportions required in the final ferrite in a current of steam at a temperature between 400° C. and 650° C. for a time dependent upon the temperature, milling the resultant product in water, calcining in air at a temperature between 150° C. and 1000° C., pressing the mixture into the desired form and heat treating to form a ferrite.

8. The process according to claim 7 in which the said mixture of metal powders is a mixture of iron, nickel and zinc powders.

9. The process according to claim 7 in which the said mixture of metal powders is a mixture of iron manganese and zinc powders.

10. The process according to claim 7 in which the said mixture of metal powders is a mixture of iron, magnesium and manganese.

11. The process according to claim 7, wherein said mixture is heated for three hours at approximately 450° C. and calcined at a temperature between 300° C. and 500° C.

12. Process of manufacturing a ferrite which comprises heating a mixture of iron powder and at least one oxide which is a constituent of the desired ferrite in a current of steam at a temperature between 400° C. and 650° C. for a time dependent upon the temperature milling the resultant product in water, calcining in air at a temperature between 150° and 1000° C., pressing the mixture into the desired form and heat treating to form a ferrite.

13. The process according to claim 12 in which the said oxide is barium oxide.

14. The process according to claim 12 in which the said oxide is nickel oxide.

15. Process of manufacturing a ferrite which comprises heating a mixture of iron powder and the powder of another metal whose oxide is required in the said ferrite and another oxide required in the said ferrite in a current of steam at a temperature between 400° C. and 650° C. for a time dependent upon the temperature, milling the resultant product in water, calcining the milled product in air at a temperature between 150° C. and 1000° C., pressing into the desired form and heat treating to form a ferrite.

16. The process according to claim 15 in which said other metal is zinc and said oxide is nickel oxide.

17. Process of manufacturing a ferrite consisting of a mixed crystal of the spinel type formed of ferric oxide and at least two other oxides which comprises heating a mixture of iron powder and powders of the other metals whose oxides are to form the ferrite in a current of steam at a temperature between 250° C. and 600° C., milling the resultant product with water, calcining the milled product in air at a temperature of at least 250° C. but less than the temperature at which ferrite formation takes place, pressing the resultant powder into a desired shape and heat treating to produce a ferrite.

18. Process of manufacturing a ferrite consisting of a mixed crystal of the spinel type formed of ferric oxide and at least manganous oxide (MnO) and another metallic oxide which comprises heating the mixture of iron powder and powders of the other metals whose oxides are to form the ferrite in a current of steam at a temperature between 250° C. and 600° C., milling the resultant product with water, calcining the milled product in air at a temperature of at least 250° C., but less than the temperature at which ferrite formation takes place for a time sufficient to carry the formation of ferric oxide almost but not quite to completion, pressing the calcined product into the desired form, heating the pressed form up to a desired temperature in air and then continuing the heating in an atmosphere of nitrogen containing a controlled percentage of oxygen to convert excess of ferric oxide over stoichiometric proportions to ferrous oxide and to form a ferrite and allowing to cool.

19. The process according to claim 18 in which another metallic oxide is zinc oxide.

20. The process according to claim 18 in which another metallic oxide is magnesium oxide.

References Cited in the file of this patent

UNITED STATES PATENTS

| | | |
|---|---|---|
| 2,391,723 | Mann | Dec. 25, 1945 |
| 2,785,049 | Whaley | Mar. 12, 1957 |

FOREIGN PATENTS

| | | |
|---|---|---|
| 683,722 | Great Britain | Dec. 3, 1952 |
| 697,059 | Great Britain | Sept. 16, 1953 |
| 1,046,482 | France | July 8, 1953 |

OTHER REFERENCES

Harvey et al.: RCA Reviews, September 1950 (pp. 345, 346).